United States Patent
Yang et al.

(10) Patent No.: US 11,142,601 B2
(45) Date of Patent: Oct. 12, 2021

(54) AQUEOUS POLYMER DISPERSION AND AQUEOUS COATING COMPOSITION COMPRISING THE SAME

(71) Applicants: Dow Global Technologies LLC, Midland, MI (US); Rohm and Haas Company, Collegeville, PA (US)

(72) Inventors: Xiaohong Yang, Shanghai (CN); Tao Wang, Highton (AU)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 266 days.

(21) Appl. No.: 16/303,671

(22) PCT Filed: Jun. 16, 2016

(86) PCT No.: PCT/CN2016/085966
§ 371 (c)(1),
(2) Date: Nov. 21, 2018

(87) PCT Pub. No.: WO2017/214918
PCT Pub. Date: Dec. 21, 2017

(65) Prior Publication Data
US 2020/0317837 A1    Oct. 8, 2020

(51) Int. Cl.
*C08F 220/14*  (2006.01)
*C08F 265/06*  (2006.01)
*C08F 275/00*  (2006.01)
*C09D 151/00*  (2006.01)
*C08F 2/22*  (2006.01)

(52) U.S. Cl.
CPC ........... *C08F 220/14* (2013.01); *C08F 2/22* (2013.01); *C08F 265/06* (2013.01); *C08F 275/00* (2013.01); *C09D 151/003* (2013.01)

(58) Field of Classification Search
CPC combination set(s) only.
See application file for complete search history.

(56) References Cited

U.S. PATENT DOCUMENTS

| | | | |
|---|---|---|---|
| 5,270,380 A | 12/1993 | Adamson et al. | |
| 5,962,571 A | 10/1999 | Overbeek et al. | |
| 6,765,049 B2 | 7/2004 | Lorah et al. | |
| 7,569,636 B2 | 8/2009 | Tennebroek et al. | |
| 8,013,050 B2 | 9/2011 | Mestach et al. | |
| 8,202,581 B2 | 6/2012 | Vetter et al. | |
| 10,487,166 B2 * | 11/2019 | Yang .................. | C08F 265/06 |
| 2004/0039089 A1 | 2/2004 | Buckmann et al. | |
| 2005/0107527 A1 * | 5/2005 | Holub ................. | C08F 2/22 524/817 |
| 2005/0203211 A1 * | 9/2005 | Gebhard .............. | C08F 265/06 523/205 |
| 2008/0146724 A1 | 6/2008 | Bohling et al. | |
| 2015/0099843 A1 * | 4/2015 | Hartig ................ | C08F 265/06 524/460 |
| 2017/0174905 A1 * | 6/2017 | Bohling .............. | C09D 151/003 |

FOREIGN PATENT DOCUMENTS

| | | |
|---|---|---|
| CA | 2829711 A1 | 10/2012 |
| CN | 103517928 A | 1/2014 |
| EP | 1686160 A1 | 8/2006 |
| JP | 2014511916 A | 5/2014 |
| WO | 2004085556 A1 | 10/2004 |
| WO | 2010027487 A1 | 3/2010 |
| WO | 2010063599 A1 | 6/2010 |
| WO | 2012087920 A1 | 6/2012 |
| WO | 2012130712 A1 | 10/2012 |
| WO | 2013016402 A1 | 1/2013 |
| WO | WO-2015086389 A1 * | 6/2015 ......... C09D 151/003 |

OTHER PUBLICATIONS

Leo, A. J.; Chemical Reviews; vol. 93, Issue No. 4, p. 1281 (1993).
Fox, T. G.; Bull, Am. Physics Soc.; vol. 1, Issue No. 3, p. 123 (1956).
International Search Report for the corresponding International Application No. PCT/CN2016/085966; dated Jun. 16, 2016; dated Mar. 21, 2017; 4 pages.
Supplementary European Search Report for the corresponding European Application No. 16905034; dated Dec. 18, 2019; 2 pages.

* cited by examiner

*Primary Examiner* — Nicole M. Buie-Hatcher
(74) *Attorney, Agent, or Firm* — Karl E. Stauss; Cantor Colburn LLP

(57) ABSTRACT

An aqueous dispersion of a multistage polymer, an aqueous coating composition having an extended open time and capable of providing coatings with good water resistance, and a process of preparing the coatings.

16 Claims, No Drawings

US 11,142,601 B2

AQUEOUS POLYMER DISPERSION AND AQUEOUS COATING COMPOSITION COMPRISING THE SAME

FIELD OF THE INVENTION

The present invention relates to an aqueous polymer dispersion and an aqueous coating composition comprising the same.

INTRODUCTION

Water based trim enamel using waterborne acrylic polymers is a popular do-it-yourself (DIY) segment in Australia, New Zealand, Europe and North America, which has successfully replaced most of solvent based alkyd products and applied onto doors, windows and some furniture. Compared to solvent based alkyd paints, one of drawbacks for waterborne acrylic paints is short open time. For example, coating compositions comprising waterborne acrylic polymers usually have a wet edge time less than 1 minute and a repair time less than 3 minutes. Open time is important in aqueous coatings, such as latex paints, to permit rebrushing over a freshly coated wet surface without causing defects such as brush marks or lap lines in the final dried coating.

Attempts have been made to prolong the open time of coating compositions comprising waterborne acrylic latexes. One method for improving the open time of an aqueous coating is disclosed in U.S. Pat. No. 5,270,380. This method involves the reactive interaction between a latex polymer and a modifying compound in which the latex polymer and modifying compound become chemically bound. The problem is that a given modifying compound will only work with a limited number of latex polymers, and therefore many different modifying compounds are required to effect an open time improvement across the wide range of possible latex polymers used in different coating compositions.

Traditionally, glycols have been used in coating compositions to increase open time, but most of glycols are volatile organic compounds (VOCs), which are less environmentally friendly and less desirable than aqueous systems. Introducing conventional open time extenders (OTEs) into aqueous acrylic polymer binders can also extend open time of the obtained coating compositions. As these OTEs usually have surfactant nature, addition of OTEs may increase water sensitivity of coating films.

Therefore, it is desirable to provide an aqueous polymer dispersion useful as a binder that is able to provide aqueous coating compositions with an extended open time and also is able to provide coating films made from the coating composition with desirable properties described above.

SUMMARY OF THE INVENTION

The present invention provides a novel aqueous multistage polymer dispersion that is useful as a binder in coating applications and an aqueous coating composition comprising the same. The aqueous coating composition of the present invention has an extended open time (at 23±2° C. and 50%±5 relative humidity, wet film thickness: 150±5 µm), for example, a wet edge time of 11 minutes or more or 12 minutes or more, and a repair time of 16 minutes or more or 18 minutes or more. The aqueous coating composition of the present invention may also provide coating films (dry film thickness: 50-60 µm) with a water resistance (24 hours) level of at least 3. The open time and water resistance are measured according to the test methods described in the Examples section.

In a first aspect, the present invention is an aqueous dispersion of a multistage polymer, wherein the multistage polymer comprises:

(A) a first polymer comprising as polymerized units, based on the weight of the first polymer, (a1) from 2.1% to 10% by weight of diacetone (meth) acrylamide, a hydroxy-functional (meth)acrylic acid alkyl ester, or mixtures thereof, (a2) from 2% to 10% by weight of a phosphorous-containing acid monomer, (a3) from 75% to 92% by weight of a hydrophilic (meth) acrylic acid alkyl ester, and (a4) from 0 to 3.8% by weight of an α, β-ethylenically unsaturated carboxylic acid;

wherein the first polymer has a number average molecular weight of from 3,000 to 100,000; and (B) a second polymer comprising as polymerized units, based on the weight of the second polymer, (b1) from 50% to 100% by weight of a hydrophobic (meth)acrylic acid alkyl ester, (b2) from 0 to 10% by weight of a carbonyl-containing functional monomer, and (b3) from 0 to 50% by weight of a hydrophilic monomer;

wherein the second polymer has a glass transition temperature at least 40° C. lower than that of the first polymer, and the weight ratio of the first polymer to the second polymer is from 25:75 to 50:50.

In a second aspect, the present invention is a process of preparing an aqueous dispersion of a multistage polymer by a multistage free-radical polymerization. The process comprises:

(i) preparing a first polymer in an aqueous medium by a free-radical polymerization in the presence of a chain transfer agent and neutralizing the obtained first polymer to a pH value of at least 6, wherein the first polymer comprises as polymerized units, based on the weight of the first polymer, (a1) from 2.1% to 10% by weight of diacetone (meth) acrylamide, a hydroxy-functional (meth)acrylic acid alkyl ester, or mixtures thereof, (a2) from 2% to 10% by weight of a phosphorous-containing acid monomer, (a3) from 75% to 92% by weight of a hydrophilic (meth) acrylic acid alkyl ester, and (a4) from 0 to 3.8% by weight of an α, β-ethylenically unsaturated carboxylic acid; and (ii) preparing a second polymer in the presence of the first polymer obtained from step (i) by a free-radical polymerization, wherein the second polymer comprises as polymerized units, based on the weight of the second polymer, (b1) from 50% to 100% by weight of a hydrophobic (meth)acrylic acid alkyl ester, (b2) from 0 to 10% by weight of a carbonyl-containing functional monomer, and (b3) from 0 to 50% by weight of a hydrophilic monomer;

wherein the second polymer has a glass transition temperature at least 40° C. lower than that of the first polymer, and the weight ratio of the first polymer to the second polymer is from 25:75 to 50:50.

In a third aspect, the present invention is an aqueous coating composition comprising the aqueous dispersion of the first aspect.

In a fourth aspect, the present invention is a process of preparing a coating, comprising:

forming the aqueous coating composition of the third aspect, applying the aqueous coating composition to a substrate, and drying, or allowing to dry, the applied aqueous coating composition to form the coating.

DETAILED DESCRIPTION OF THE INVENTION

"Open time" is the time that an aqueous coating composition remains workable after it has been applied to a substrate, for example, the time to permit re-brushing or re-rolling over the freshly coated wet surface without causing defects such as brush marks or lap lines resulting from differences in coating thickness in the final dried coating films. Open time can be determined by both wet edge time and repair time.

"Hydrophobic" monomer in the present invention refers to a monomer that has a Hansch value ≥2.20. "Hydrophilic" monomer in the present invention refers to a monomer that has a Hansch value <2.20. Hansch values may be determined by the method described by A. J. Leo in Chem. Rev., Volume 93, Issue No. 4, page 1281 (1993).

"Acrylic" in the present invention includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

Glass transition temperature ($T_g$) values in the present invention are those calculated by using the Fox equation (T. G. Fox, Bull. Am. Physics Soc., Volume 1, Issue No. 3, page 123 (1956)). For example, for calculating the $T_g$ of a copolymer comprising polymerized units of monomers $M_1$ and $M_2$, $$\frac{1}{T_g(calc.)} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the $T_g$ of the homopolymer of $M_1$, and $T_g(M_2)$ is the $T_g$ of the homopolymer of $M_2$, all temperatures being in K. The glass transition temperatures of homopolymers may be found, for example, in "Polymer Handbook", edited by J. Brandrup and E. H. Immergut, Interscience Publishers.

The multistage polymer in the aqueous dispersion of the present invention comprises a first polymer and a second polymer.

The first polymer useful in the present invention may comprise, as polymerized units, one or more monomers (a1) selected from diacetone (meth)acrylamide, a hydroxy-functional (meth)acrylic acid alkyl ester, or mixtures thereof. Preferred diacetone (meth)acrylamide is diacetone acrylamide (DAAM). The hydroxy-functional (meth)acrylic acid alkyl ester useful in the present invention may have the structure of formula (I):

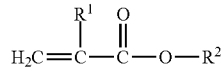

wherein $R^1$ is hydrogen or methyl, and $R^2$ is a hydroxyalkyl group having from 2 to 6 carbon atoms. Examples of suitable hydroxy-functional (meth)acrylic acid alkyl esters include 2-hydroxyethyl acrylate; 2-hydroxyethyl methacrylate; and 2-hydroxyethyl ethacrylate; hydroxypropyl (meth)acrylate including, for example, 2-hydroxypropylacrylate, 2-hydroxypropyl methacrylate, 3-hydroxypropyl acrylate, 3-hydroxypropyl methacrylate; hydroxybutyl (meth)acrylate including, for example, 3-hydroxybutyl acrylate, 3-hydroxybutyl methacrylate, 4-hydroxybutyl acrylate, and 4-hydroxybutyl methacrylate; 6-hydroxyhexyl acrylate; 6-hydroxyhexylmethacrylate; 3-hydroxy-2-ethylhexyl acrylate; 3-hydroxy-2-ethylhexyl methacrylate; or mixtures thereof. The combined amount of diacetone (meth)acrylamide, the hydroxy-functional (meth)acrylic acid alkyl ester, or mixtures thereof, as polymerized units of the first polymer, may be 2.1% by weight or more, 3% by weight or more, or even 4% by weight or more, and at the same time, 10% by weight or less, 8% by weight or less, or even 6% by weight or less, based on the weight of the first polymer. "Weight of the first polymer" in the present invention refers to dry weight or solids weight of the first polymer.

The first polymer useful in the present invention may further comprise as polymerized units, one or more phosphorous-containing acid monomers (a2). Examples of suitable phosphorous-containing acid monomers include phosphoalkyl (meth)acrylates such as phosphoethyl (meth)acrylate, phosphopropyl (meth)acrylate, phosphobutyl (meth)acrylate, salts thereof, and mixtures thereof; $CH_2=C(R)—C(O)—O—(R_1O)_n—P(O)(OH)_2$, wherein R=H or $CH_3$, $R_1$=alkyl and n=0-12, such as SIPOMER PAM-100, SIPOMER PAM-200 and SIPOMER PAM-300 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, salts thereof, and mixtures thereof. Preferred phosphorus-containing acid monomers are dihydrogen phosphate monomers, which include 2-phosphoethyl (meth)acrylate, 2-phosphopropyl (meth)acrylate, 3-phosphopropyl (meth)acrylate, 3-phospho-2-hydroxypropyl (meth)acrylate, SIPOMER PAM-100, SIPOMER PAM-200, SIPOMER PAM-300, or mixtures thereof. The first polymer may comprise as polymerized units, based on the weight of the first polymer, 2% by weight or more of the phosphorous-containing acid monomers, 2.8% by weight or more, 3% by weight or more, or even 4% by weight or more, and at the same time, 10% by weight or less, 8% by weight or less, 7% by weight or less, or even 6% by weight or less.

The first polymer useful in the present invention may comprise, as polymerized units, one or more hydrophilic (meth)acrylic acid alkyl esters (a3) that are different from the hydroxy-functional (meth)acrylic acid alkyl ester (a2) described above. That is, the hydrophilic (meth)acrylic acid alkyl ester (a3) herein excludes the hydroxy-functional (meth)acrylic acid alkyl ester described above. The hydrophilic (meth)acrylic acid alkyl ester may be a (meth)acrylic acid alkyl ester having a $C_1$ to $C_2$ alkyl group. Examples of suitable hydrophilic (meth)acrylic acid alkyl esters include methyl (meth)acrylate, ethyl (meth)acrylate, or mixtures thereof. Preferred hydrophilic (meth)acrylic acid alkyl esters are methyl methacrylate, ethyl acrylate, or mixtures thereof. The first polymer may comprise as polymerized units, based on the weight of the first polymer, 75% by weight or more of the hydrophilic (meth)acrylic acid alkyl ester, 80% by weight or more, or even 86% by weight or more, and at the same time, 92% by weight or less, or even 90% by weight or less.

The first polymer useful in the present invention may optionally comprise as polymerized units, one or more α, β-ethylenically unsaturated carboxylic acids (a4). Examples of suitable α, β-ethylenically unsaturated carboxylic acids include an acid-bearing monomer such as (meth)acrylic acid, itaconic acid, or fumaric acid; or a monomer bearing an acid-forming group which yields or is subsequently convertible to, such an acid group (such as anhydride, (meth)acrylic anhydride, or maleic anhydride); or mixtures thereof. The first polymer may be free of polymerized units of α, β-ethylenically unsaturated carboxylic acids or may comprise as polymerized units, based on the weight of the first polymer, from 0 to 3.8% by weight of the α, β-ethylenically unsaturated carboxylic acids, for example, 3.5% by weight or less, 2% by weight or less, or even 1.5% by weight or less, of the α, β-ethylenically unsaturated carboxylic acids.

The first polymer useful in the present invention may have a $T_g$ of from 60° C. to 110° C. or from 70° C. to 110° C. The first polymer in the multistage polymer may have a number average molecular weight ($M_n$) of 3,000 or more, 4,500 or more, or even 5,000 or more, and at the same time, 100,000 or less, 50,000 or less, 30,000, or even 20,000 or less. In some embodiments, the first polymer is an oligomer. "Oligomer" herein refers to a polymer having a $M_n$ of from 3,000 to 30,000. $M_n$ herein may be determined by Gel Permeation Chromatography (GPC) analysis using a polystyrene standard or calculated as follows, $$Mn=[W(\text{monomer})+W(CTA)]/\text{Mole}(CTA),$$

wherein W(monomer) is the total weight of monomers used in preparing the first polymer, W(CTA) is the total weight of a chain transfer agent used in preparing the first polymer, and Mole(CTA) is the total moles of the chain transfer agent used in preparing the first polymer.

The multistage polymer useful in the present invention may further comprise a second polymer (B). The second polymer may comprise, as polymerized units, one or more hydrophobic (meth)acrylic acid alkyl esters (b1). Examples of suitable hydrophobic (meth)acrylic acid alkyl esters include butyl (meth)acrylate, iso-butyl (meth)acrylate, 2-ethylhexyl acrylate, lauryl (meth)acrylate, stearyl (meth) acrylate, or mixtures thereof. Preferred hydrophobic (meth) acrylic acid alkyl esters are selected from 2-ethylhexyl acrylate, butyl acrylate, or mixtures thereof. The second polymer may comprise as polymerized units, based on the weight of the second polymer, 50% by weight or more of the hydrophobic (meth)acrylic acid alkyl esters, 55% by weight or more, or even 60% by weight or more, and at the same time, 100% by weight or less, 90% by weight or less, 80% by weight or less, or even 70% by weight or less. "Weight of the second polymer" in the present invention refers to dry weight or solids weight of the second polymer.

The second polymer may also comprise, as polymerized units, one or more carbonyl-containing functional monomers (b2). Examples of suitable carbonyl-containing functional monomers include DAAM, acetoacetoxyethyl (meth) acrylate, acetoacetoxypropyl (meth)acrylate, acetoacetoxybutyl (meth)acrylate, 2,3-di(acetoacetoxy) propyl (meth)acrylate, allyl acetoacetates, vinyl acetoacetates, acetoacetamides of Formula (I):

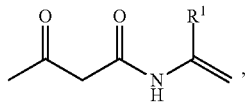

wherein $R^1$ is H or methyl, or a combination thereof. Preferably, an ethylenically unsaturated monomer bearing a carbonyl group such as DAAM or acetoacetoxyethyl (meth) acrylate is used as the monomer (b2). Preferred carbonyl-containing functional monomer is DAAM. The second polymer may comprise as polymerized units, based on the weight of the second polymer, from 0 to 10% by weight of the carbonyl-containing functional monomers, for example, 0.8% by weight or more, 1.5% by weight or more, 2.0% by weight or more, or even 2.5% by weight or more, and at the same time, 10% by weight or less, 8% by weight or less, or even 6% by weight or less.

The second polymer may further comprise, as polymerized units, one or more hydrophilic monomers (b3). The hydrophilic monomers may include the hydrophilic (meth) acrylic acid alkyl ester and the hydroxy-functional (meth) acrylic acid alkyl ester described above in the first polymer section. Examples of suitable hydrophilic monomers include methyl (meth)acrylate, ethyl (meth)acrylate, 2-hydroxyethyl (meth)acrylate or mixtures thereof. The second polymer may comprise as polymerized units, based on the weight of the second polymer, from 0 to 50% by weight of the hydrophilic monomers (b3), for example, 1% by weight or more, 5% by weight or more, 10% by weight or more, 17.5% by weight or more, or even 20% by weight or more, and at the same time, 45% by weight or less, 40% by weight or less, or even 35% by weight or less.

The second polymer useful in the present invention may have a $T_g$ at least 40° C. lower than that of the first polymer, at least 50° C. lower than that of the first polymer, or at least 60° C. or lower than that of the first polymer. The second polymer may have a $T_g$ of –60° C. or higher, for example, from –50° C. to 60° C., or from –40° C. to 40° C. The weight ratio of the first polymer to the second polymer may be in the range of from 25:75 to 50:50 or from 30:70 to 40:60.

In some preferred embodiments, the multistage polymer in the aqueous dispersion of the present invention comprises the first polymer which comprises as polymerized units, based on the weight of the first polymer, (a1) from 3% to 6% by weight of diacetone (meth) acrylamide such as DAAM, the hydroxy-functional (meth) acrylic acid alkyl ester such as 2-hydroxyethyl (meth)acrylate, or mixtures thereof;

(a2) from 2.8% to 6% by weight of the phosphorous-containing acid monomer such as phosphoethyl (meth) acrylate, SIPOMER PAM-100, SIPOMER PAM-200, SIPOMER PAM-300, or mixtures thereof;

(a3) from 80% to 90% by weight of the hydrophilic (meth)acrylic acid alkyl ester such as methyl (meth)acrylate, ethyl (meth)acrylate, or mixtures thereof; and (a4) from 0 to 3.5% by weight of the α, β-ethylenically unsaturated carboxylic acid such as (meth)acrylic acid, itaconic acid, fumaric acid, or mixtures thereof;

the second polymer comprises as polymerized units, based on the weight of the second polymer, (b1) from 60% to 80% by weight of the hydrophobic (meth)acrylic acid alkyl ester such as 2-ethylhexyl acrylate, iso-butyl (meth)acrylate, lauryl (meth)acrylate, butyl (meth)acrylate, or mixtures thereof;

(b2) from 2.5% to 8% by weight of the carbonyl-containing functional monomer such as DAAM, acetoacetoxyethyl (meth)acrylate, or mixtures thereof; and (b3) from 5% to 40% by weight of the hydrophilic monomer such as methyl (meth)acrylate.

The types and levels of the monomers described above may be chosen to provide the multistage polymer with a $T_g$ suitable for different applications. The $T_g$ of the multistage polymer may be in the range of from −10° C. to 40° C., from 0° C. to 30° C., or from 5° C. to 25° C. The multistage polymer particles may have a particle size of from 40 nanometers (nm) to 300 nm or from 50 nm to 250 nm, as measured by a BI-90 Particle Sizer.

In addition to the multistage polymer particles, the aqueous dispersion of the multistage polymer of the present invention may further comprise a polyfunctional carboxylic hydrazide containing at least two hydrazide groups per molecule. The polyfunctional carboxylic hydrazides may act as a crosslinker and may be selected from adipic dihydrazide, oxalic dihydrazide, tartaric acid dihydrazide, isophthalic dihydrazide, polyacrylic polyhydrazide, or mixtures thereof. The concentration of the polyfunctional carboxylic hydrazide may be from 0 to 10% by weight or from 0.5% to 5% by weight, based on the total weight of the first and second polymers.

The aqueous dispersion of the multistage polymer of the present invention further comprises water. The concentration of water may be, based on the total weight of the aqueous dispersion, from 30% to 90% by weight or from 40% to 80% by weight. The aqueous dispersion of the multistage polymer may be useful in many applications including, for example, wood coatings, architecture coatings, and traffic paints.

The present invention also relates to a process of preparing the aqueous dispersion of the multistage polymer of the present invention. Such process may include a multistage free-radical polymerization in which at least two stages are formed sequentially, which usually results in the formation of the multistage polymer comprising at least two polymer compositions such as the first polymer and the second polymer. The aqueous dispersion of the multistage polymer may be prepared by, a process of preparing the first polymer followed by preparing the second polymer. Each stage of the multistage free-radical polymerization can be conducted by polymerization techniques well known in the art such as suspension polymerization or emulsion polymerization of the monomers described above. Emulsion polymerization is a preferred process. For each monomer, types and concentration of the monomer based on the total weight of monomers used in preparing the first polymer or the second polymer is substantially the same as the types and concentration of copolymerized such monomer based on the total weight of the first polymer or the second polymer, respectively. Total weight concentration of monomers for preparing the first polymer and the second polymer, respectively, is equal to 100%. A mixture of the monomers for preparing the first polymer or the second polymer may be added neat or as an emulsion in water; or added in one or more additions or continuously, linearly or nonlinearly, over the reaction period of preparing the first polymer or the second polymer, or combinations thereof. Temperature suitable for emulsion polymerization processes may be lower than 100° C., for example, in the range of from 30° C. to 95° C., or in the range of from 50° C. to 90° C.

In the multistage free-radical polymerization process, free radical initiators may be used in each stage. The multistage free-radical polymerization process may be thermally initiated or redox initiated emulsion polymerization in each stage. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of monomers. Redox systems comprising the above described initiators coupled with a suitable reductant may be used in the multistage free-radical polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the multistage free-radical polymerization process, a surfactant may be used in each stage. The surfactant may be added prior to or during the polymerization of the monomers, or combinations thereof. A portion of the surfactant can also be added after the polymerization. Surfactants may be used for both stages. In some embodiments, surfactants are only used in the first stage of the process of preparing the multistage polymer, where the obtained first polymer may act as a surfactant to emulsify a monomer mixture used for preparing the second polymer. The total dosage of surfactants used in the multistage polymerization process of the present invention can be lower than conventional emulsion polymerization processes. These surfactants may include anionic and/or nonionic emulsifiers. Examples of suitable surfactants include alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. In some preferred embodiments, the alkali metal or ammonium salts of alkyl, aryl, or alkylaryl sulfates surfactant are used. The combined amount of the surfactant used is usually from 0.1% to 6% by weight or from 0.3% to 1.5% by weight, based on the weight of total monomers used for preparing the multistage polymer.

In the multistage free-radical polymerization process, a train transfer agent may be used in the stage of preparing the first polymer. Examples of suitable chain transfer agents include 3-mercaptopropionic acid, dodecyl mercaptan, methyl 3-mercaptopropionate, butyl 3-mercaptopropionate, benzenethiol, azelaic alkyl mercaptan, or mixtures thereof. The chain transfer agent may be used in an effective amount to control the molecular weight of the first polymer. For example, the chain transfer agent may be present in an amount of from 0.3% to 3% by weight, from 1% to 2.5% by weight, or from 1.5% to 2% by weight, based on the total weight of monomers used for preparing the first polymer. In some embodiments, the process of preparing the aqueous dispersion of the multistage polymer includes preparing the first polymer in the presence of the chain transfer agent and neutralizing the obtained first polymer to a pH value of at least 6, from 6 to 10, or from 7 to 9. After preparing the first polymer, the process of preparing the aqueous dispersion of the multistage polymer further includes preparing the second polymer by polymerizing a monomer mixture of the hydrophobic (meth)acrylic acid alkyl ester (b1), and optionally the carbonyl-containing functional monomer (b2) and/or the hydrophilic monomer (b3) in the presence of the first polymer. The pH value of the obtained multistage polymer may be controlled to be at least 7.

Neutralization in the process of preparing the aqueous dispersion of the multistage polymer may be conducted by using one or more bases as neutralizers. The bases may lead to partial or complete neutralization of the ionic or latently ionic groups of the first polymer or the multistage polymer. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, di-npropylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof.

The process of preparing the aqueous dispersion of the multistage polymer of the present invention may further comprise adding the polyfunctional carboxylic hydrazide containing at least two hydrazide groups per molecule described above into the obtained multistage polymer described above.

The aqueous coating composition of the present invention comprises the aqueous dispersion of the multistage polymer described above. The aqueous multistage polymer dispersion in the aqueous coating composition of the present invention may be present, by solids weight based on the total weight of the aqueous coating composition, in an amount of 10% or more, 13% or more, or even 15% or more, and at the same time, 50% or less, 40% or less, or even 30% or less.

The aqueous coating composition of the present invention may also comprise pigments and/or extenders. "Pigments" herein refer to materials that can provide whiteness and color including inorganic pigments and organic pigments. Inorganic pigments typically include metal oxides. Examples of suitable metal oxides include titanium dioxide ($TiO_2$), zinc oxide, iron oxide, zinc sulfide, barium sulfate, barium carbonate, or mixture thereof. In a preferred embodiment, the pigment used in the present invention is $TiO_2$. $TiO_2$ typically exists in two crystal forms, anastase and rutile. Suitable commercially available $TiO_2$ include, for example, KRONOS 2310 available from Kronos Worldwide, Inc., Ti-Pure R-706 available from DuPont (Wilmington, Del.), TiONA AT1 available from Millennium Inorganic Chemicals, or mixtures thereof. $TiO_2$ may be also available in concentrated dispersion form. Organic pigments typically refer to opaque polymers including, for example, those under the tradename ROPAQUE™ from The Dow Chemical Company. "Extenders" herein refer to white transparent or semi-transparent components, whose purpose is to reduce the cost of the coating by increasing the area covered by a given weight of pigment. Examples of suitable extenders include calcium carbonate, clay, calcium sulfate, aluminosilicates, silicates, zeolites, mica, diatomaceous earth, solid or hollow glass, ceramic beads, nepheline syenite, feldspar, diatomaceous earth, calcined diatomaceous earth, talc (hydrated magnesium silicate), silica, alumina, kaolin, pyrophillite, perlite, baryte, wollastonite, or mixtures thereof. The concentration of the pigments and/or extenders may be, based on the total weight of the aqueous coating composition, from 0 to 60% by weight, from 1% to 35% by weight, or from 5% to 30% by weight.

The aqueous coating composition of the present invention may also comprise one or more pigment dispersants which will have impact on film properties including open time. Examples of suitable pigment dispersants include those under the tradename OROTAN™ from The Dow Chemical Company, such as OROTAN 731 A, OROTAN 1124; OROTAN 165, OROTAN 2001, OROTAN CA-2500, and OROTAN 681 dispersants. The pigment dispersants preferably have a Mw>2,000 Daltons, more preferably >5,000 Daltons. Those pigment dispersants may be used in pigment grinding stage or letdown stage of making coating compositions. The pigment dispersants may be present, based on the total weight of the aqueous coating composition, in an amount of from 0 to 10% by weight, from 0.1% to 10% by weight, or from 0.2% to 5% by weight.

The aqueous coating composition of the present invention may also comprise one or more surfactants. The surfactants include both nonionic and anionic types but do not include alkylphenol ethoxylate (APE) surfactants. Suitable anionic surfactants may include emulsifiers such as alkali metal and ammonium salts of $C_6$ to $C_{18}$ alkyl sulfates, of $C_6$ to $C_{18}$ alkyl phosphonates, of sulfuric monoesters or phosphoric mono- and diesters of ethoxylated $C_6$ to $C_{22}$ alkanols with 2 to 50 ethylene oxide (EO) units, of $C_{12}$-$C_{18}$ alkylsulfonic acids, of $C_9$-$C_{18}$ alkylarylsulfonic acids, of sulfosuccinic monoesters and sulfosuccinic diesters of $C_6$-$C_{22}$ alkanols and ethoxylated $C_6$-$C_{22}$ alkanols with 2 to 50 EO units. Specific examples of suitable anionic surfactants include polyoxyethylene tridecyl ether phosphates (commercially available in the free acid form as RHODAFAC RS-610 from Solvay). Suitable nonionic surfactants may include ethoxylates of long-chain branched or unbranched $C_6$-$C_{36}$ alcohols with 3 to 50 EO units, such as TERGITOL™ 15-S—X family from The Dow Chemical Company (TERGITOL is a trademark of The Dow Chemical Company), or EMULSOGEN EPN 407 from BASF. The amount of total surfactants used may be in a range of 0.01% to 5.0% by weight or in the range of 0.1% to 3% by weight, based on the dry weight of the aqueous dispersion of the multistage polymer.

The aqueous coating composition of the present invention may further comprise one or more matting agents. "Matting agents" herein refer to any inorganic or organic particles that provide a matt effect. Matting agents usually have an average particle size of 5.5 μm or more according to the ASTM E2651-10 method. The matting agents may be selected from silica matting agents, polyurea matting agents, polyacrylate, polyethylene, polytetrafluoroethene, or mixtures thereof. The concentration of the matting agent may be, based on the total weight of the aqueous coating composition, from 0 to 5% by dry weight, from 0.1% to 4% by dry weight, or from 0.5% to 3.5% by dry weight.

The aqueous coating composition of the present invention may further comprise one or more defoamers. "Defoamers" herein refer to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. Suitable commercially available defoamers include, for example, TEGO Airex 902 W and TEGO Foamex 1488 polyether siloxane copolymer emulsions both available from TEGO, BYK-022 silicone deformer available from BYK, or mixtures thereof. The concentration of the defoamer may be, based on the total weight of the aqueous coating composition, generally from 0 to 1% by weight, from 0.01% to 0.8% by weight, or from 0.05% to 0.5% by weight.

The aqueous coating composition of the present invention may further comprise one or more thickeners, also known as "rheology modifiers". The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydroxypropyl cellulose. Preferably, the thickener is based on HEUR. The concentration of the thickener may be, based on the total weight of the aqueous coating composition, generally from 0 to 5% by weight, from 0.05% to 2% by weight, or from 0.1% to 1% by weight.

The aqueous coating composition of the present invention may further comprise one or more wetting agents. "Wetting agents" herein refer to chemical additives that reduce the surface tension of a coating composition, causing the coating composition to more easily spread across or penetrate the surface of a substrate. Wetting agents may be polycarboxylates, anionic, zwitterionic, or non-ionic. Suitable commercially available wetting agents include, for example, SURFYNOL 104 nonionic wetting agent based on an actacetylenic diol available from Air Products, BYK-346 and BYK-349 polyether-modified siloxanes both available from BYK, or mixtures thereof. The concentration of the wetting agent may be, based on the total weight of the aqueous coating composition, from 0 to 5% by weight, 0.01% to 2% by weight, or from 0.2% to 1% by weight.

The aqueous coating composition of the present invention may further comprise one or more coalescents. "Coalescents" herein refer to slow-evaporating solvents that fuse polymer particles into a continuous film under ambient condition. Examples of suitable coalescents include 2,2,4-trimethyl-1,3-pentanediol monoisobutyrate, 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include 2,2,4-trimethyl-1,3-pentanediol monoisobutyrate, dipropylene glycol n-butyl ether, ethylene glycol monobutyl ether, diethylene glycol monobutyl ether, n-butyl ether, or mixtures thereof. The coalescents may contain one or more water-soluble coalescents. Preferred water-soluble coalescents include alkylene glycols, for example, ethylene glycol, propylene glycol, or mixtures thereof. The concentration of the coalescents may be, based on the dry weight of the aqueous dispersion of the multistage polymer, from 0 to 40% by weight, from 0.01% to 20% by weight, or from 1% to 10% by weight.

The aqueous coating composition of the present invention may further comprise water. The concentration of water may be, by weight based on the total weight of the aqueous coating composition, from 30% to 90%, from 40% to 80%, or from 50% to 70%.

In addition to the components described above, the aqueous coating composition of the present invention may further comprise any one or combination of the following additives: buffers, neutralizers, dispersants, humectants, mildewcides, biocides, anti-skinning agents, colorants, flowing agents, anti-oxidants, plasticizers, leveling agents, thixotropic agents, adhesion promoters, and grind vehicles. These additives may be present in a combined amount of from 0 to 10% by weight, from 0.001% to 5% by weight, or from 0.01% to 2% by weight, based on the total weight of the aqueous coating composition.

The aqueous coating composition of the present invention may be prepared by admixing the multistage polymer and optionally the polyfunctional carboxylic hydrazide with other optional components, e.g., pigments and/or extenders as described above. Components in the aqueous coating composition may be mixed in any order to provide the aqueous coating composition of the present invention. Any of the above-mentioned optional components may also be added to the composition during or prior to the mixing to form the aqueous coating composition.

The aqueous coating composition of the present invention preferably has an extended open time. "Extended open time" means the open time of the aqueous coating composition comprising the multistage polymer is longer than that of the same composition absent the multistage polymer as measured in the same way under the same conditions. For example, the aqueous coating composition of the present invention, when applied to a substrate with a wet film thickness of 150±5 μm, has a wet edge time of 11 minutes or more or 12 minutes or more, and a repair time of 16 minutes or more or 18 minutes or more, at 23±2° C. and 50%±5 relative humidity (RH), according to the test method described in the Examples section below.

The present invention also provides a method of preparing a coating. The method may comprise: forming the aqueous coating composition of the present invention, applying the aqueous coating composition to a substrate, and drying, or allowing to dry, the applied aqueous coating composition to form the coating. The aqueous coating composition of the present invention can also provide coatings (dry film thickness: 50-60 μm) with a water resistance (24 hours) level of at least 3. The open time and water resistance are measured according to the test methods described in the Examples section.

A process of using the aqueous coating composition of the present invention may comprise the following: applying the aqueous coating composition to a substrate, and drying, or allowing to dry, the applied aqueous coating composition. The aqueous coating composition of the present invention can be applied to a substrate by incumbent means including brushing, dipping, rolling and spraying. The aqueous coating composition is preferably applied by brushing. The standard spray techniques and equipment for spraying such as air-atomized spray, air spray, airless spray, high volume low pressure spray, and electrostatic spray such as electrostatic bell application, and either manual or automatic methods can be used. After the aqueous coating composition of the present invention has been applied to a substrate, the aqueous coating composition can dry, or allow to dry, to form a film (this is, coating) at room temperature (20-25° C.), or at an elevated temperature, for example, from 35° C. to 60° C.

The aqueous coating composition of the present invention can be applied to, and adhered to, various substrates. Examples of suitable substrates include wood, metals, plastics, foams, stones, elastomeric substrates, glass, fabrics, concrete, or cementious substrates. The aqueous coating composition is suitable for various coating applications, such as marine and protective coatings, automotive coatings, architectural coatings, wood coatings, coil coatings, plastic coatings, can coatings, and civil engineering coatings. The aqueous coating composition can be used alone, or in combination with other coatings to form multi-layer coatings.

EXAMPLES

Some embodiments of the invention will now be described in the following Examples, wherein all parts and percentages are by weight unless otherwise specified.

The following materials are used in synthesis of aqueous polymer dispersions:

Methacrylic acid ("MAA"), itaconic acid ("IAA"), Acrylic acid ("AA"), methyl methacrylate ("MMA"), n-butyl acrylate ("BA"), 2-ethylhexyl acrylate ("EHA"), 2-Hydroxyethyl methacrylate ("HEMA"), and methyl 3-mercaptopropanoate ("MMP"), are all available from Sinoreagent Group.

Diacetone acrylamide ("DAAM") and adipic dihydrazide ("ADH") are both available from Kyowa Hakko Chemical Co., Ltd.

Phosphoethyl methacrylate ("PEM") is available from The Dow Chemical Company.

Ammonium persulphate ("APS") and Sodium persulphate (SPS) are available from Sinoreagent Group.

Sodium lauryl sulfate (SLS), available from Stepan, is used as a surfactant.

DISPONIL Fes-32 ("Fes-32"), available from BASF, is a fatty alcohol ether sulphate, sodium salt.

The following standard analytical equipment and methods are used in the Examples.

Gloss

The gloss of coating films was measured according to the ASTM D523 method using a BYK Micro-Tri-Gloss meter.

Pigment Volume Concentration (PVC)

$$PVC = \frac{\text{Volume of the pigment} \times 100}{\text{Volume of pigment} + \text{Volume of solid binder}}$$

Water Resistance Test

A coating composition to be tested was casted on scrub vinyl charts using a 6 Mil Bird applicator. The obtained panels dried in a CTR (25° C. and 50% RH) for 7 days to form dry coating films with thickness of 50-60 μm. Then the panels were merged in tap water for 24 hours. After removing the panels from water, blistering and swell of the coating films were inspected visually. Water resistance is rated as 1-5 according to the number of blisters as follows, 5—no blister and no appearance change of the coating films;

4—≤1 blister per cm² of the coating films;

3—>1 and ≤2 blisters per cm² of the coating films;

2—3-5 blisters per cm² of the coating films;

1—>5 blisters per cm² of the coating films.

Water resistance (24 hours) being at least 3 is acceptable. 5 score means the best water resistance and 1 means the worst water resistance.

Open Time Test

Leneta Black Plain Charts were secured to a Glass Drawdown Plate in a constant temperature and humidity room (CTR, 23°±2 C and 50%±5 RH). A coating composition to be tested was drawn down lengthwise on the charts using a 6 mil drawdown bar with a wet thickness of 150±5 μm. In 1 minute, 12 crosses in the shape of an "X" were made by cutting through the freshly coated wet film using the tip of a brush handle (ACCENT Decorator Paint Brush 38 mm). After 2 minute when the first "X" was made, ¼ of the brush was dipped into the coating composition, and then 10 brush strokes in both directions (forward and backward) were applied at the first X across the film, followed by brushing other "X" at an interval time of 2 minutes between brushing each "X" using the same number of brush strokes for each time. The time when brushing the first "X" was recorded as the starting time of testing. The coating composition was allowed to dry for 24 hours in the CTR. Wet edge time is recorded as the latest time when the edge of the drawdown coating film is visible to the naked eye. Repair time is recorded as the latest time when the "X" is no longer visible to the naked eye. The wet edge time being 11 minutes or more and the repair time being 16 minutes or more are acceptable.

GPC Analysis

GPC analysis was performed generally by an Agilent 1200. A sample was dissolved in tetrahydrofuran (THF)/formic acid (FA)(5%) with a concentration of 2 mg/mL and then filtered through 0.45 μm polytetrafluoroethylene (PTFE) filter prior to GPC analysis. The GPC analysis was conducted using the following conditions:

Columns: PLgel Guard Column (10 μm, 50 mm×7.5 mm) and PLgel MIXED GEL B (10 μm); column temperature: 40° C.; mobile phase: THF/FA (5%); flow rate: 1.0 mL/minute; injection volume: 100 μL; detector: Agilent Refractive Index detector, 40° C.; and calibration curve: PL Polystyrene Narrow standards with molecular weights ranging from 2,329,000 to 580 g/mol, using polynom 3 fitness. Data was collected from duplicate injections.

Example (Ex) 1 Aqueous Polymer Dispersion PD63

Preparation of Monomer Emulsion 1: Fes-32 surfactant (7.44 grams (g), 31.00% active) was dissolved in deionized (DI) water (148.99 g) with stirring. Then MMA (334.24 g), DAAM (12.70 g), PEM (16.59 g) and MMP (7.19 g) were added into the resultant surfactant solution to obtain Monomer Emulsion 1.

Preparation of Monomer Emulsion 2: Fes-32 surfactant (3.72 g, 31.00% active) was dissolved in DI water (179.55 g) with stirring. Then EHA (257.81 g), BA (196.75 g), MMA (202.93 g) and DAAM (20.21 g) were added into the resultant surfactant solution to obtain Monomer Emulsion 2.

A solution containing Fes-32 surfactant (1.24 g, 31.00% active) and DI water (657.57 g) was added into a 4-neck, 3-liter round bottom flask equipped with a thermocouple, a cooling condenser and an agitator, and was heated to 85° C. under nitrogen atmosphere. An aqueous APS initiator solution (2.01 g of APS in 38.07 g of DI water), and 4.3% by weight of Monomer Emulsion 1 obtained above were then added into the flask. Within about 5 minutes, initiation of polymerization was confirmed by a temperature increase by 3-6° C. and a change of the external appearance of the reaction mixture. After heat generation stopped, the remaining Monomer Emulsion 1 was added gradually to the flask over a period of 40 minutes with stirring. At the same time, an aqueous APS initiator solution (1.27 g of APS in 60.23 g of DI water) was added gradually to the flask over a period of 50 minutes. And the temperature was maintained at 84-86° C. After the APS initiator was consumed, gradually added 163.40 g of ammonia (25% active) into the flask over 15 minutes. Then the reaction mixture was held at 84° C. for 30 minutes.

Monomer Emulsion 2 obtained above was then added into the flask in the same manner as Monomer Emulsion 1 over 60 minutes. Then an aqueous APS initiator solution (1.52 g of APS in 72.28 g of DI water) was added gradually to the flask over a period of 60 minutes. Upon completing addition, the reaction mixture was held at 70° C. for 10 minutes. A water solution of t-BHP (21 g, 3.33% active) and IAA (20.25 g, 2.53% active) was then fed into the flask over 30 minutes followed by cooling to 40° C. Then ADH slurry (20.86 g in 40.00 g DI water) was added at 40° C. over 10 minutes and held for 20 minutes. The resulting dispersion was cooled to room temperature and filtered to obtain the aqueous polymer dispersion PD63 with 41% solids.

Exs 2-5 Aqueous Polymer Dispersions PD31, PD32, PD36 and PD11

The aqueous polymer dispersions of PD31, PD32, PD36 and PD11 were prepared, respectively, according to the same procedure as described above for preparing the aqueous polymer dispersion of Ex 1 (PD63), based on formulations of Monomers described in Table 1.

A polymerization vessel equipped with metering devices and temperature regulation was charged at room temperature under a nitrogen atmosphere with 420.25 g of DI water and 17.35 g (15% active) aqueous solution of SLS, and this initial charge was heated to 80° C. with stirring. When this temperature had been reached, an aqueous APS initiator solution (2.60 g of APS in 34.8 g of DI water) was added, and the mixture was stirred for 2 minutes. Thereafter Monomer Emulsion 1 was commenced and was metered in over the course of 32 minutes. After the end of Monomer Emulsion 1, polymerization was continued for 10 minutes, then an ammonia solution (12.5 g, 3.2% active) was added over 10 minutes. Subsequently Monomer Emulsion 2 was commenced and was metered incontinuously over the course of 104 minutes, at a constant flow rate. 52 minutes after the start of addition of Monomer Emulsion 2, 15.63 g (3.2% active) of ammonia solution were added. After the end of addition of Monomer Emulsion 2, the polymerization mixture was reacted for 90 minutes more at 80° C. Then 28.35 g (5% active) ammonia solution were added over 5 minutes. Subsequently the aqueous polymer dispersion obtained was cooled to room temperature. At a temperature below 40° C., 65 g (25.14% active) of an aqueous solution of ADH were added. The obtained CPD29 aqueous polymer dispersion had a pH value of 8.04 and solids of 40.76% by weight, wherein $T_g$ of polymer (stage 1) made from the Monomer Emulsion 1 and polymer (stage 2) made from the Monomer Emulsion 2 were 72.7° C. and −21.31° C., respectively, as calculated by the Fox equation described above.

Comp Ex B Aqueous Polymer Dispersion CPD30

The aqueous polymer dispersion CPD30 was prepared according to the same procedure as described above for

TABLE 1

| | | Polymer Dispersions | | | | | | |
|---|---|---|---|---|---|---|---|---|
| | | PD63 | PD31 | PD32 | PD36 | PD11 | CPD65 | CPD51 |
| Monomers for the first polymer | MMA (g) | 334.24 | 331.46 | 327.83 | 334.24 | 334.24 | 346.92 | 360.26 |
| | MAA (g) | 0 | 5.45 | 12.7 | 0 | 0 | 0 | 41.65 |
| | PEM (g) | 16.59 | 13.89 | 10.25 | 16.59 | 16.59 | 16.59 | 0 |
| | DAAM (g) | 12.7 | 12.7 | 12.7 | 12.7 | 0 | 0 | 14.58 |
| | HEMA (g) | 0 | 0 | 0 | 0 | 12.7 | 0 | 0 |
| $T_g$ of the first polymer (° C.) | | 105 | 106 | 107 | 105 | 103 | 105 | 112 |
| Monomers for the second polymer | MMA (g) | 202.93 | 202.93 | 202.93 | 223.14 | 202.93 | 202.93 | 312.37 |
| | BA (g) | 196.75 | 196.75 | 196.75 | 196.75 | 196.75 | 196.75 | 56.23 |
| | EHA (g) | 257.81 | 257.81 | 257.81 | 257.81 | 257.81 | 257.81 | 237.4 |
| | DAAM (g) | 20.21 | 20.21 | 20.21 | 0 | 20.21 | 20.21 | 18.74 |
| $T_g$ of the second polymer (° C.) | | −38.6 | −38.6 | −38.6 | −35.9 | −38.6 | −38.6 | −14.7 |

Comparative (Comp) Ex A Aqueous Polymer Dispersion CPD29

Preparation of Monomer Emulsion 1: SLS surfactant (4.35 grams, 15% active) was dissolved in DI water (117.40 g) with stirring. Then MMA (124.80 g), DAAM (15.60 g), AA (2.95 g), MAA (12.70 g), ST (19.50 g), BA (19.50 g) and MMP (1.83 g) were added into the resultant surfactant solution to obtain Monomer Emulsion 1.

Preparation of Monomer Emulsion 2: SLS surfactant (8.65 g, 15.00% by weight of solids) was dissolved in DI water (215.75 g) with stirring. Then BA (314.60 g) and MMA (140.40 g) were added into the resultant surfactant solution to obtain Monomer Emulsion 2.

preparing the aqueous polymer dispersion of Comp Ex A (CPD29) above, based on the following Monomer Emulsions.

Preparation of Monomer Emulsion 1: SLS surfactant (4.35 grams, 15% active) was dissolved in DI water (117.40 g) with stirring. Then MMA (124.80 g), DAAM (15.60 g), AA (2.95 g), MAA (12.70 g), ST (19.50 g), BA (19.50 g) and MMP (1.83 g) were added into the resultant surfactant solution to obtain Monomer Emulsion 1.

Preparation of Monomer Emulsion 2: SLS surfactant (8.65 g, 15.00% active) was dissolved in DI water (215.75 g) with stirring. Then BA (314.60 g), MMA (126.75 g) and DAAM (13.65 g) were added into the resultant surfactant solution to obtain Monomer Emulsion 2.

The obtained CPD30 aqueous dispersion had a pH value of 8.08, and solids of 40.33% by weight, wherein $T_g$ of the polymer made from the Monomer Emulsion 1 and the polymer made from the Monomer Emulsion 2 were 72.7° C. and −23.24° C., respectively, as calculated by the Fox equation described above.

Comp Ex C Aqueous Polymer Dispersion CPD51

The aqueous polymer dispersion of CPD51 was prepared according to the same procedure as described above for preparing the aqueous polymer dispersion of Ex 1 (PD63), based on formulations of Monomers described in Table 1 except that the dosage of MMP in CPD51 was 8.2 g.

Comp Ex D Aqueous Polymer Dispersion CPD65

The aqueous polymer dispersion of CPD65 was prepared according to the same procedure as described above for preparing the aqueous polymer dispersion of Ex 1 (PD63), based on formulations of Monomers described in Table 2.

TABLE 2

Properties of polymer dispersions

| Polymer dispersions | pH | Solids (% by weight) | Viscosity[3] (cps) | Particle size (nm) | $M_n$ (First polymer) |
|---|---|---|---|---|---|
| PD63 | 10.37 | 40.6 | 12 | 158 | 6,076[1] |
| PD31 | 10.15 | 42.04 | 15 | 135 | 7,523[2] |
| PD32 | 10.06 | 42.45 | 121 | 206 | 7,326[2] |
| PD36 | 10.18 | 40.44 | 12 | 132 | 6,960[2] |
| PD11 | 10.32 | 39.07 | 12 | 126 | 6,076[1] |
| CPD29 | 7.94 | 40.52 | 71 | 73 | 12,808[1] |
| CPD30 | 7.85 | 40.59 | 76 | 77 | 12,808[1] |
| CPD51 | 8.09 | 40.26 | 126 | 54 | 6,076[1] |
| CPD65 | 10.41 | 41.41 | 12 | 149 | 6,076[1] |

[1]$M_n$ calculated by Mn = [W(monomer) + W(CTA)]/Mole(CTA) described above.
[2]$M_n$ measured by the GPC analysis described above in the test method section.
[3]Viscosity measured by Brookfield viscometer DV-I Primer (spindle 2#).

Exs 6-10 and Comp Exs E-H Coating Compositions

Coating compositions of Exs 6-10 and Comp Exs E-H comprising the aqueous polymer dispersions obtained above as binders were prepared, based on formulations described in Table 3.

Firstly, pigment grind was prepared. 50 g of water was placed in a 1 L stainless steel container and added 6 g of OROTAN 731A and 0.5 g of AMP-95. 315 g of Ti-pure R-706 was introduced later under shear with a mixer at 450 rpm. After Ti-pure R-706 was mixed uniformly, the speed of the mixer was increased to 1000 rpm and kept for 10 minutes and then 27 g of water was added to the resultant mixture to form the pigment grind. Secondly, 772 g of the as prepared binder was introduced in a 2 L stainless steel container and added the pigment grind slowly with stirring at 450 rpm. After the pigment grind and the binder were mixed for 10 minutes, the rest of the materials listed in the letdown section in Table 3 were added slowly. After all ingredients were added, the obtained coating composition was stirred for 15 minutes at 250 rpm. The resulting coating composition was then kept in CTR for 16 hours for equilibrium before testing. All the coating compositions obtained above had a volume solid content of 37.8%, solids of 50.57% by weight, and a PVC of about 20.9%. The obtained coating compositions and dry coating films made therefrom were evaluated according to the test methods described above and results are listed in Table 4.

TABLE 3

Aqueous Coating Composition

| Materials | Grams | Function | Supplier |
|---|---|---|---|
| Grind | | | |
| Water | 50 | | |
| OROTAN 731A (a sodium salt of a hydrophobic acrylic copolymer) | 6 | Dispersant | The Dow Chemical Company |
| AMP ™-95 (2-amino-2-methyl-1-propanol) | 0.5 | Neutralizing Agent | Angus Chemical |
| Ti-Pure R-706 titanium dioxide | 316 | Pigment | DuPont |
| Water | 27 | | |
| LetDown | | | |
| Binder | 772 | Binder | |
| Water | 6.66 | | |
| UCAR ™ Filmer IBT | 18 | Coalescent | The Dow Chemical Company |
| ACRYSOL ™ RM-2020 NPR | 20 | Rheology modifier | The Dow Chemical Company |
| EMULSOGEN EPN 407 | 3.3 | Surfactant | BASF |
| ROCIMA ™ 350 | 2 | Biocide | The Dow Chemical Company |
| BYK-022 | 1 | Defoamer | BYK |
| OROTAN CA-2500 | 6 | Dispersant | The Dow Chemical Company |
| Propylene glycol | 30 | Solvent | The Dow Chemical Company |
| Total | 1258.46 | | |

AMP, ACRYSOL, ROCIMA and UCAR are trademarks of The Dow Chemical Company.

As shown in Table 4, the coating compositions of Comp Exs E-G all provided coating films with unacceptable short open time. The coating composition of Comp Ex H showed acceptable open time but poor water resistance. In contrast, the coating compositions of Exs 6-10 all provided coating films with both good open time and acceptable water resistance.

TABLE 4

| | | Comp Ex E | Comp Ex F | Comp Ex G | Comp Ex H | Ex 6 | Ex 7 | Ex 8 | Ex 9 | Ex 10 |
|---|---|---|---|---|---|---|---|---|---|---|
| Binder | | CPD29 | CPD30 | CPD51 | CPD65 | PD63 | PD31 | PD32 | PD36 | PD11 |
| 20° gloss | | 36.3 | 35.9 | 21.1 | 24 | 28 | 23.4 | 22.1 | 23.4 | 36 |
| 60° gloss | | 71.9 | 71.1 | 59 | 63 | 66 | 62.2 | 61.2 | 62.2 | 72 |
| Open Time, min | Wet edge time | 4 | 5 | 6 | 16 | 13 | 14 | 11 | 12 | 13 |
| | Repair time | 10 | 14 | 12 | 25 | 23 | 23 | 16 | 22 | 25 |
| Water Resistance | | 5 | 5 | 5 | 1 | 3 | 5 | 4 | 3 | 5 |

What is claimed is:

1. An aqueous dispersion of a multistage polymer, wherein the multistage polymer comprises:
    (A) a first polymer comprising as polymerized units, based on the weight of the first polymer,
        (a1) from 2.1% to 10% by weight of diacetone (meth)acrylamide, a hydroxy-functional (meth)acrylic acid alkyl ester, or mixtures thereof,
        (a2) from 2.8% to 10% by weight of a phosphorous-containing acid monomer,
        (a3) from 75% to 92% by weight of a hydrophilic (meth)acrylic acid alkyl ester, and
        (a4) from 0 to 3.8% by weight of an α, β-ethylenically unsaturated carboxylic acid;
    wherein the first polymer has a number average molecular weight of from 3,000 to 20,000; and
    (B) a second polymer comprising as polymerized units, based on the weight of the second polymer,
        (b1) from 50% to 100% by weight of a hydrophobic (meth)acrylic acid alkyl ester,
        (b2) from 0 to 10% by weight of a carbonyl-containing functional monomer, and
        (b3) from 0 to 50% by weight of a hydrophilic monomer;
        wherein the second polymer has a glass transition temperature at least 40° C. lower than that of the first polymer, and the weight ratio of the first polymer to the second polymer is from 25:75 to 50:50.

2. The aqueous dispersion of claim 1, wherein the second polymer comprises as polymerized units, based on the weight of the second polymer, from 0.8% to 10% by weight of the carbonyl-containing functional monomer.

3. The aqueous dispersion of claim 1, further comprising from 0.5% to 10% by weight of a polyfunctional carboxylic hydrazide containing at least two hydrazide groups per molecule, based on the total weight of the first and second polymers.

4. The aqueous dispersion of claim 3, wherein the polyfunctional carboxylic hydrazide is selected from adipic dihydrazide, tartaric acid dihydrazide, oxalic dihydrazide, isophthalic dihydrazide, polyacrylic polyhydrazide, or mixtures thereof.

5. The aqueous dispersion of claim 1 wherein the hydroxy-functional (meth)acrylic acid alkyl ester is selected from 2-hydroxyethyl (meth)acrylate, hydroxypropyl (meth)acrylate, hydroxybutyl (meth)acrylate, or mixtures thereof.

6. The aqueous dispersion of claim 1 wherein the phosphorous-containing acid monomer (a2) is selected from phosphoethyl (meth)acrylate, phosphopropyl (meth)acrylate, phosphobutyl (meth)acrylate, or mixtures thereof.

7. The aqueous dispersion of claim 1 wherein the hydrophilic (meth)acrylic acid alkyl ester (a3) is selected from methyl (meth)acrylate, ethyl (meth)acrylate, or mixtures thereof.

8. The aqueous dispersion of claim 1 wherein the hydrophobic (meth)acrylic acid alkyl ester (b1) is selected from butyl (meth)acrylate, iso-butyl (meth)acrylate, 2-ethylhexyl acrylate, lauryl (meth)acrylate, stearyl (meth)acrylate, or mixtures thereof.

9. The aqueous dispersion of claim 1, wherein the weight ratio of the first polymer to the second polymer is from 30:70 to 40:60.

10. The aqueous dispersion of claim 1, wherein the first polymer has a glass transition temperature of from 60° C. to 110° C., and the second polymer has a glass transition temperature of −50° C. or higher.

11. The aqueous dispersion of claim 1, wherein the first polymer comprises as polymerized units, based on the weight of the first polymer,
    (a1) from 3% to 6% by weight of diacetone (meth)acrylamide, the hydroxy-functional (meth)acrylic acid alkyl ester, or mixtures thereof;
    (a2) from 2.8% to 6% by weight of the phosphorous-containing acid monomer;
    (a3) from 80% to 90% by weight of the hydrophilic (meth)acrylic acid alkyl ester; and
    (a4) from 0 to 3.5% by weight of the α, β-ethylenically unsaturated carboxylic acid; and
    the second polymer comprises as polymerized units, based on the weight of the second polymer,
    (b1) from 60% to 80% by weight of the hydrophobic (meth)acrylic acid alkyl ester,
    (b2) from 2.5% to 8% by weight of the carbonyl-containing functional monomer, and
    (b3) from 5% to 40% by weight of the hydrophilic monomer.

12. An aqueous coating composition comprising the aqueous dispersion of claim 1.

13. A process of preparing a coating, comprising:
    forming the aqueous coating composition of claim 12,
    applying the aqueous coating composition to a substrate, and
    drying, or allowing to dry, the applied aqueous coating composition to form the coating.

14. The coating composition of claim 12 when applied to a substrate at a thickness of 145 to 155 microns has a wet edge time of 11 minutes or more and/or a repair time of 16 minutes or more at 21-25° C. and 45-55% relative humidity.

15. The coating composition of claim 12 when applied to a substrate and dried at a dry film thickness of 50 to 60 microns has a 24-hour water resistance level of at least 3.

16. A process of preparing an aqueous dispersion of a multistage polymer by a multistage free-radical polymerization, comprising:
    (i) preparing a first polymer in an aqueous medium by a free-radical polymerization in the presence of a chain transfer agent and neutralizing the obtained first polymer to a pH value of at least 6, wherein the first polymer comprises as polymerized units, based on the weight of the first polymer,
        (a1) from 2.1% to 10% by weight of diacetone (meth)acrylamide, a hydroxy-functional (meth)acrylic acid alkyl ester, or mixtures thereof,
        (a2) from 2.8% to 10% by weight of a phosphorous-containing acid monomer,
        (a3) from 75% to 92% by weight of a hydrophilic (meth)acrylic acid alkyl ester, and
        (a4) from 0 to 3.8% by weight of an α, β-ethylenically unsaturated carboxylic acid; and
    (ii) preparing a second polymer in the presence of the first polymer obtained from step (i) by a free-radical polymerization, wherein the second polymer comprises as polymerized units, based on the weight of the second polymer,
        (b1) from 50% to 100% by weight of a hydrophobic (meth)acrylic acid alkyl ester,
        (b2) from 0 to 10% by weight of a carbonyl-containing functional monomer, and
        (b3) from 0 to 50% by weight of a hydrophilic monomer;
        wherein the second polymer has a glass transition temperature at least 40° C. lower than that of the first polymer, and the weight ratio of the first polymer to the second polymer is from 25:75 to 50:50 and wherein the number average molecular weight of the first polymer is from 3000 to 20,000.

* * * * *